UNITED STATES PATENT OFFICE

WILLIAM MORGAN BROWN, OF LONDON, ENGLAND, ASSIGNEE OF JOHN LIGHTFOOT.

IMPROVEMENT IN DYEING AND PRINTING TEXTILE FABRICS.

Specification forming part of Letters Patent No. 111,654, dated February 7, 1871; reissue No. 7,430, dated December 12, 1876; application filed December 6, 1876.

DIVISION B.

*To all whom it may concern:*

Be it known that JOHN LIGHTFOOT, late of Lowerhouse, near Burnley, in the county of Lancaster, England, chemist, invented a new and useful Improvement in Printing and Dyeing Textile Fabrics and Yarns, whereof the following is a full and exact description.

This improvement relates to the preparation of mixtures suitable for printing or dyeing textile fabrics or yarns, so as to produce or develop therein the color known as "aniline-black;" and it consists in a certain method of producing chlorate of ammonia, and of combining therewith a salt or salts of aniline and a suitable metallic salt, whereby is obtained not only a valuable color-mixture for aniline-black, but also a commercially available by-product, which cheapens the cost of manufacture.

The mode of procedure is as follows: Dissolve sixty ounces of tartaric acid in six quarts of boiling water, adding, by degrees, twenty-five ounces of sesquicarbonate of ammonia, or an equivalent quantity of caustic ammonia, so as to form a bitartrate of ammonia. Then dissolve in another vessel four pounds of chlorate of potash in six quarts of boiling water, and mix it at once with the bitartrate of ammonia. Allow this mixture to stand until perfectly cold, and then filter out the cream of tartar, and wash it with three quarts of cold water. By this means chlorate of ammonia and cream of tartar sufficiently pure for the market are obtained. The washings are added to the filtrate, and the filtrate is then thickened with eighteen pounds of British gum, (calcined starch,) or ten pounds of starch, or a mixture of the two, heated from 150° Fahrenheit to 212° Fahrenheit, according to the thickening material made use of. Then add together two quarts of aniline (by preference Dale's No. 2) and three pints of the best hydrochloric acid at 32° Twaddell. Allow this mixture to stand until perfectly cold, and then mix it with the thickened filtrate. When quite cold, and just before using, add twelve to twenty-four ounces of sulphate-of-copper crystals, or five and a half gills of sulphide-of-copper paste.

After printing this color-mixture, age the prints one night by hanging in a room at from 60° to 70° Fahrenheit, and raise in soda liquor about 1° Twaddell; wash, soap, and finish in the usual way.

When the color-mixture is printed along with madder or garancine mordants, the prints, after being hung and aged one night, may be passed through ammoniacal gas, and are dunged, dyed, and finished in the usual manner for such styles.

In the process of dyeing, use the same color-mixture, prepared according to the mode of procedure before described, with the exception of the introduction of thickening matter, which should be omitted; but add one pint of acetic acid at 8° Twaddell, and one-half pound of common sugar to each gallon of dye-liquor, and use only about one and a half ounce of sulphate of copper to the gallon, instead of the larger quantity added when the thickening matter is employed. Pad the cloth or dip the yarns in the dye-liquor so prepared, wring out, and dry in a cool room, age one night, as before, and raise in any weak alkali.

Certain other metallic salts than those of copper may be used in color-mixtures for producing aniline-black—such, for instance, as the soluble salts of iron, their oxides or sulphides, or these metals may be used in a fine state of division.

The invention herein claimed is—

The method of preparing color-mixtures for aniline-black, by producing chlorate of ammonia, and combining therewith a salt or salts of aniline and a suitable metallic salt, substantially as described.

WILLIAM MORGAN BROWN.

Witnesses:

S. C. HOPPER,
38 *Southampton Buildings, Chancery Lane, London.*

C. HAMMOND,
38 *Southampton Buildings, London.*